Oct. 24, 1944.    H. A. MARSH    2,360,882
LEVELING DEVICE FOR AVIATION TRAINERS
Filed June 29, 1942    2 Sheets-Sheet 1

HAROLD A. MARSH
INVENTOR.

BY Donald T. Hillier

ATTORNEY.

Oct. 24, 1944. H. A. MARSH 2,360,882
LEVELING DEVICE FOR AVIATION TRAINERS
Filed June 29, 1942 2 Sheets-Sheet 2
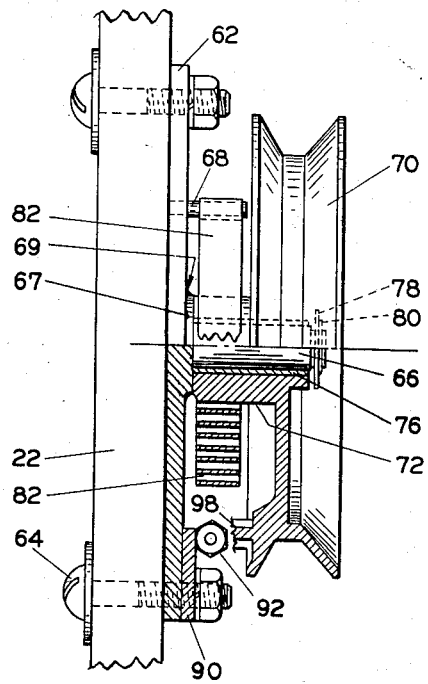
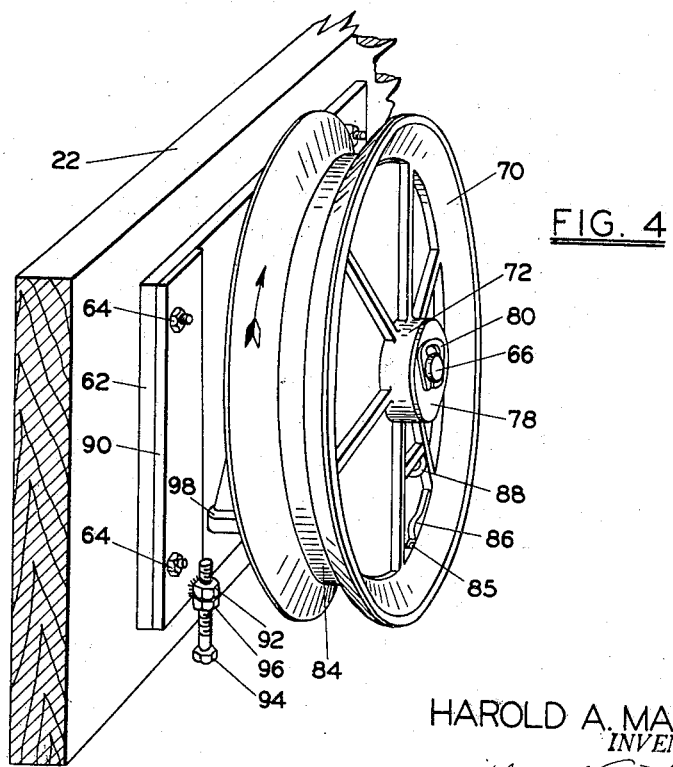
HAROLD A. MARSH
INVENTOR.

Patented Oct. 24, 1944

2,360,882

UNITED STATES PATENT OFFICE 2,360,882

LEVELING DEVICE FOR AVIATION TRAINERS

Harold A. Marsh, Binghamton, N. Y., assignor to Link Aviation Devices, Inc., Binghamton, N. Y., a corporation of New York Application June 29, 1942, Serial No. 448,880

9 Claims. (Cl. 35—12)

My invention relates to means for leveling a platform mounted upon a universal joint, said means comprising in my preferred embodiment a system of pulleys and cables and means for applying force to the ends of these cables.

My invention is particularly useful, and a preferred embodiment of it will be illustrated and described in connection with an aviation trainer such as is described in United States Patents 1,825,462 and 2,099,857.

Inasmuch as such a trainer is mounted upon a universal joint, when the motor furnishing the power to tilt the trainer on its universal joint is not running, the device will not remain balanced upon the universal joint, but instead, one side becomes lower according to the effect of gravity. Such a condition exists when a student has finished a "problem" and has shut off the motor prior to making his exit from the trainer. The only mechanism in the prior art available to prevent this undesirable knocking about of the trainer was a plurality of iron arms pivoted to the octagon and designed to fasten onto iron rods projecting from the base of the fuselage of the trainer. The student could not lock these two parts together before leaving the trainer as they were necessarily without his reach. This situation made it necessary for the instructor or some other person to always be present whenever the student desired to shut off the trainer motor.

It is a principal object of my invention to provide means within the reach of the student whereby the trainer may be brought to a level position, thus making it possible for the student to shut off the trainer motor without endangering himself or any part of the apparatus.

It is a further object of my invention to provide such means which may be within the reach of the instructor as well as of the student.

It is a further object of my invention to provide such leveling means which will not interfere in any way with the operation of the trainer.

Referring now to the drawings accompanying this application, and wherein like reference numerals indicate like parts, Fig. 1 is a side view of a grounded trainer with portions thereof cut away to show the general relation thereto of my invention.

Fig. 3 is a sectional view taken along the line III—III of Fig. 2 of one of the pulley assemblies which form part of my invention.

Fig. 4 is a perspective view of such a pulley assembly.

Figure 1:
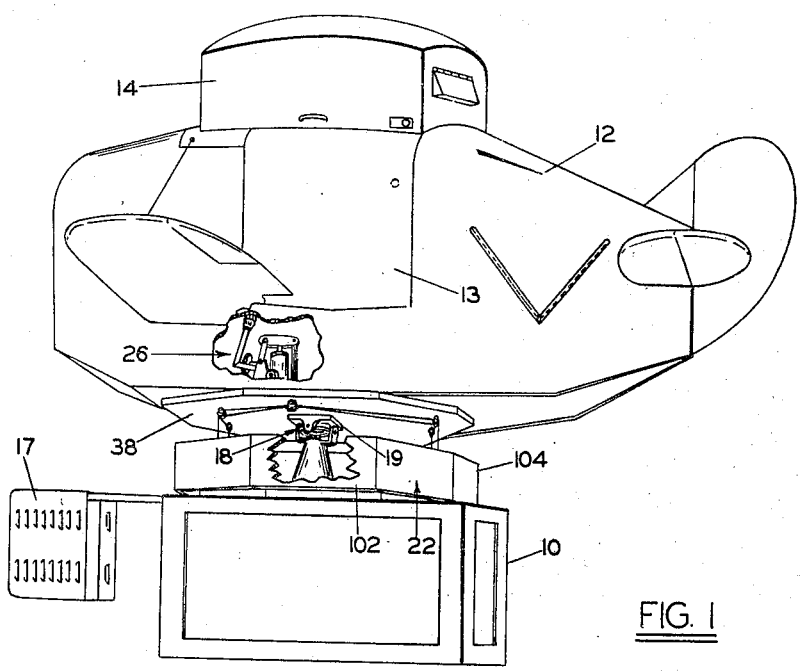

The above-mentioned patents disclose in detail the construction and operation of a grounded trainer, it being deemed sufficient for one to understand the instant invention to know that in Fig. 1 which shows the general construction of such a trainer, the reference character 10 refers to the base portion while 12 designates the fuselage of the trainer. A door 13 allows access to the cockpit of the trainer and a hood 14 may be closed over the cockpit when desired. The fuselage 12 is mounted upon a universal joint designated generally by 18 about which the fuselage may be tipped in any direction in simulation of an airplane in actual flight. The bottom 38 of the fuselage rests upon a plate 19 which is integral with the upper part of the universal joint 18. The above-mentioned tilting is caused by manipulation of the controls of the trainer by the student in the cockpit in a manner fully described in the above-mentioned U. S. patents, and, as also there described, the trainer may be rotated about its vertical axis through 360° by means of controls also within the cockpit and which actuate turning motor 17. Turning motor 17, by means of a wheel and belt arrangement, then produces such a turning. Base 10 is at all times stationary, but the trainer is constructed in such a manner that octagon 22 rotates about the vertical axis whenever turning motor 17 is working, and with octagon 22 also rotates universal joint 18, plate 19, bottom 38, and fuselage 12. However, because universal joint 18 is disposed between the bottom 38 and octagon 22, it will be realized that whenever fuselage 12 is made to tilt about universal joint 18, octagon 22 will nevertheless remain in its level position. It will therefore be realized that octagon 22, bottom 38 and fuselage 12 always make identical rotation about the vertical axis, but by means of universal joint 18, bottom 38 and fuselage 12 can tilt laterally and longitudinally with respect to octagon 22.

Figure 2:
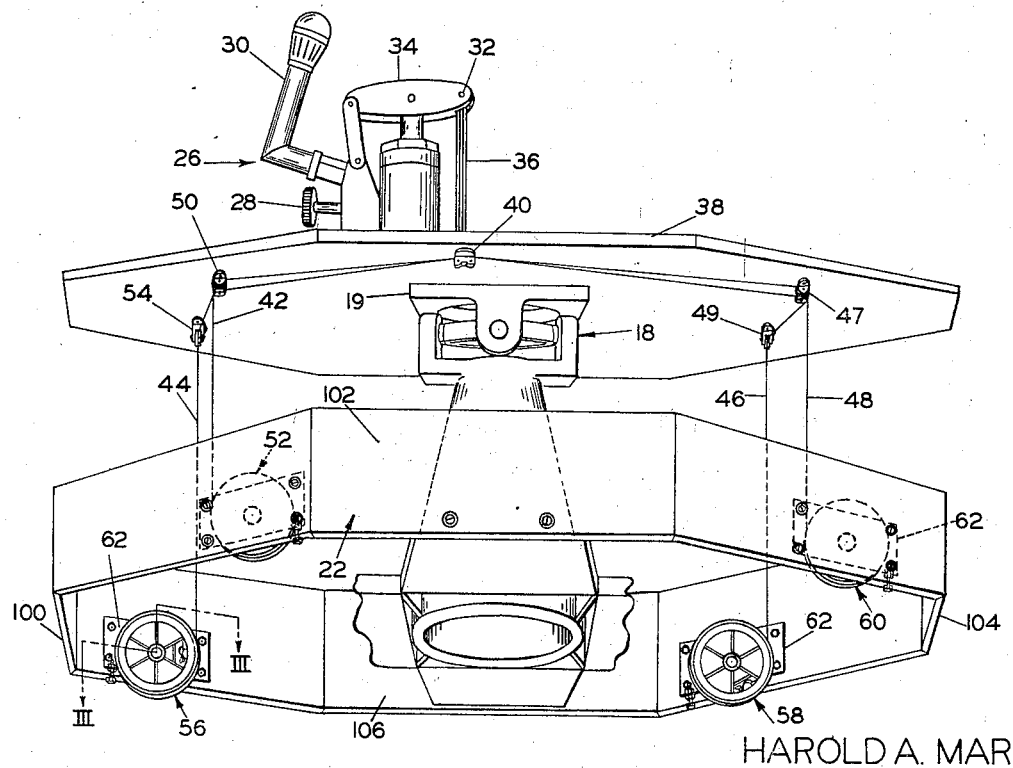
Fig. 2 is a diagrammatic view of the apparatus of this invention.

A preferred embodiment of my invention includes a hydraulic jack designated generally in Fig. 1 by the number 26. Referring to Fig. 2, upon the closing of screw 28 and the pumping of handle 30, the end 32 of lever 34 becomes elevated. This movement exerts force upon four cables indicated generally as 36.

On the bottom 38 of the fuselage 12 is a stationary pulley block 40 within which are four pulleys and two horizontal shafts, two of said pulleys being mounted upon each of said shafts. All four cables go through the fuselage bottom 38 and into the pulley block 40 where each cable runs on one of the four pulleys mounted therein.

At this point, two of the cables 42 and 44 turn toward the front of the fuselage while the two remaining cables 46 and 48 run in the opposite direction. Cable 42 enters pulley block 50 where it turns downward in the direction of the octagon 22 and then runs to pulley assembly designated generally as 52. Cable 44 also enters pulley block 50 where its direction is turned toward pulley block 54 which is on the right side of the trainer fuselage where it again changes direction and runs to pulley assembly designated generally as 56.

Cable 46 travels a route similar to that of cable 44 except that it runs toward the rear of the trainer, passing through pulley blocks 47 and 49 and terminating at the pulley assembly designated generally as 58. Cable 48 travels a route similar to that of cable 42 except that it runs toward the rear of the fuselage, passing through pulley block 47 and terminating at the pulley assembly designated generally as 60.

The pulley assemblies designated generally by 52, 56, 58 and 60 are identical in all respects and are each mounted upon plates 62 which are likewise similar. Referring to Figs. 3 and 4, each of these pulley assemblies has a plate 62 which is rigidly affixed to its respective side of the octagon 22 by means of bolts 64. A shaft 66 has an integral flange 67 which bears against the face of plate 62, the end of shaft 66 being received in plate 62. Flange 67 is welded to plate 62 at 69. Pulley wheel 70 has a web and rib construction integral with a hub 72 and within said hub is a bearing 76 which bears against shaft 66, upon which pulley 70 is mounted. A washer 78 and spring clip 80 retain pulley wheel 70 in its correct position upon the shaft 66. Hub 72 spaces the pulley wheel 70 from plate 62.

A pin 68 also integral with plate 62 projects therefrom, this pin being placed some distance radially from shaft 66. A flat torsion spring 82 is provided, each of the ends of which is fashioned in a loop, the loop on the outer end of said flat torsion spring being fitted over pin 68, and the loop on the inner end thereof being inserted in a counterbore (not shown) of suitable shape in hub 72. Flat torsion spring 82 will of course at all times seek to unwind, and, when doing so, inasmuch as the outer end is mounted upon pin 68, the inner end which is attached to the hub 72 will be the moving part. In so moving, it will cause a rotation of wheel 70 in the direction of the arrow in Fig. 4.

In the groove 84 of the pulley wheel is a hole 85 large enough to admit the end of the cable which is bent around cam 86 and held in position by U-bolt 88.

As shown in Fig. 4, bolted to plate 62 by means of some of the bolts 64 is another narrow plate 90 which has a stop 92 projecting therefrom. Stop 92 is interiorly threaded for the reception of an adjusting screw 94 upon which is placed a jam nut 96. There is also projecting from the inner side of pulley wheel 70 a stop 98 having a radial distance to the shaft 66 equal to that of stop 92. Because of this arrangement, wheel 70 is limited to a movement of slightly less than one revolution.

When my invention comprises the foregoing parts, arranged as shown and described, it may be adjusted as follows:

The trainer fuselage 12 is leveled by other suitable means. The screw 28 is closed and the handle 30 of jack 26 is pumped, which action raises the end 32 of lever 34. Pulley wheels 70 are then turned in the direction opposite the arrow shown in Fig. 4 (that is, against the action of the spring 82) until the stop 98 on pulley wheel 70 is directly above and in contact with the stop 92 of metal plate 90. With the trainer thus leveled and the pulley wheels 70 being held against the action of the springs 82, the four cables are each drawn tight through the hole 85 in the appropriate pulley wheel 70 and fastened by the U-bolt 88, as above described.

With the apparatus so adjusted, for one side of the bottom 38 of the fuselage 12 to become lower at least two of the cables 42, 44, 46 or 48 must be loosened. This is possible only by a lowering of the end 32 of lever 34 or by a turning of two of the pulleys 52, 56, 58 or 60 in the direction opposite the arrow shown in Fig. 4, i. e., so as to unwind the cables thereupon. Such a turning is impossible because of the action of the stops 92 and 98. Therefore, whenever the end 32 of lever 34 is elevated by means of jack 26, fuselage 12 is balanced upon universal joint 18, and entrance to or exit from the cockpit of the trainer will not change this condition.

When it is desired that the student "fly" the trainer, the screw 28 is released and the jack 26 no longer retains the end 32 of lever 34 in the elevated position. The springs 82 are then strong enough to turn the pulley wheels in the direction shown by the arrow in Fig. 4, thereby pulling the end 32 of lever 34 down to its lowest position. In doing this, pulley wheels 70 turn about ⅓ of a revolution. Thereafter, it will be realized, pulley wheels 70 may turn in both directions. As the trainer is tilted about the universal joint 18, pulley wheels 70 actuated by springs 82 at all times keep cables 42, 44, 46 and 48 tight. But springs 82 are not so strong as to interfere with the banking and pitching of the fuselage 12 when the trainer is in operation.

The side 100 of octagon 22 is at all times under the front of the fuselage 12. Side 102 is similarly at the left side, side 104 at the rear, and side 106 under the right side of the fuselage. Bearing this fact in mind and referring to the drawings, it is clear that there is a pulley 70 mounted upon every other side of the octagon and that these major pulleys are mounted upon those four sides of the octagon which form an angle with the fore and aft center line of the fuselage. Because of this arrangement, whenever the nose of fuselage 12 drops, the two pulley wheels 52 and 56 located under the nose of the fuselage take up the cable slack while the two rear pulley wheels 58 and 62 release the cable necessary to allow such a movement. Likewise, whenever the fuselage 12 tilts in any direction, two of these wheels take up and the remaining two release a portion of the cable which is connected to it.

While my invention is especially adapted to and has been described in connection with a grounded aviation trainer, it should be pointed out that it is equally useful when employed in connection with any device which has a movable platform which it is desired to bring into a certain position relative to another member.

The foregoing being a preferred embodiment of my invention only, I do not limit myself other than by the appended claims.

I claim:

1. An aviation trainer comprising two parts, one of said parts being mounted upon a universal joint for tilting in all directions, and means for tilting said part in relation to the second part in combination with means independent of sai tilting means for bringing said tilting part to a level position, said leveling means comprising a plurality of take-up pulleys having limited rotation attached to one of said parts, a plurality of cables, one end of each of said cables being attached to one of said pulleys, guide means for said cables attached to the other of said parts, manually operated means for tightening said cables, and a spring for rotating each of said pulleys in a manner to constantly tighten said cables.

2. In combination with two members, one of said members being mounted upon a universal joint for tilting in relation to the second member, means for bringing said tilting member into a level position, said means comprising a plurality of take-up pulleys having limited rotation attached to one of said members, a plurality of cables, one end of each of said cables being attached to one of said pulleys, guide means for said cables attached to the other of said members; manually operated means for tightening said cables, and a spring for rotating each of said pulleys in a manner to constantly tighten said cables.

3. An aviation trainer comprising two parts, one of said parts being mounted upon a universal joint for tilting in all directions, and means for tilting said part in relation to the second part, in combination with means independent of said tilting means for bringing said tilting part to the level position, said leveling means comprising a plurality of take-up pulleys having limited rotation attached to the lower of said parts, a plurality of cables, one end of each of said cables being attached to one of said pulleys, guide means for said cables attached to the upper of said parts, manually operated means for tightening said cables, and a spring for rotating each of said pulleys in a manner to constantly tighten said cables.

4. In combination with two members, one of said members being mounted upon a universal joint for tilting in relation to the second member, means for bringing said tilting member into a level position, said means comprising a plurality of take-up pulleys having limited rotation attached to the lower of said parts, a plurality of cables, one end of each of said cables being attached to one of said pulleys, guide means for said cables attached to the upper of said members, manually operated means for tightening said cables, and a spring for rotating each of said pulleys in a manner to constantly tighten said cables.

5. An aviation trainer comprising two parts, one of said parts being mounted upon a universal joint for tilting in all directions, means for rotating both of said parts, and means for tilting said first-mentioned part relative to said second part, in combination with means independent of said tilting means for bringing said tilting part to a level position, said leveling means comprising a plurality of take-up pulleys having limited rotation attached to one of said parts, a plurality of cables, one end of each of said cables being attached to one of said pulleys, guide means for said cables attached to the other of said parts, manually operated means for tightening said cables, and a spring for rotating each of said pulleys in a manner to constantly tighten said cables.

6. In combination with two members, one of said members being mounted upon a universal joint for tilting in all directions, means for rotating said members, and means for bringing said tilting member into a level position, said leveling means comprising a plurality of take-up pulleys having limited rotation attached to one of said members, a plurality of cables, one end of each of said cables being attached to one of said pulleys, guide means for said cables attached to the other of said members, manually operated means for tightening said cables, and a spring for rotating each of said pulleys in a manner to constantly tighten said cables.

7. An aviation trainer comprising a fuselage mounted upon a universal joint for tilting in all directions, a lower horizontal member, and means for tilting said fuselage to the desired position, in combination with means independent of said first-mentioned means for bringing said tilting part to a level position, said last-mentioned means comprising a plurality of take-up pulleys having limited rotation attached to said lower member, a plurality of cables, one end of each of said cables being attached to each of said pulleys, guide means for said cables attached to said fuselage, manually operated means within said fuselage for applying pressure to the ends of said cables away from said pulleys, and a spring for rotating each of said pulleys in a manner to constantly tighten said cables.

8. An aviation trainer comprising two parts, one of said parts being mounted upon a universal joint for tilting in all directions in relation to the second part, in combination with means for bringing said tilting part to a level position, said means comprising a plurality of takeup pulleys attached to one of said parts, a plurality of cables, one end of each of said cables being attached to one of said pulleys, guide means for said cables attached to the other of said parts, a spring for rotating each of said pulleys in a manner to constantly tighten said cables, means under the control of an operator for tightening said cables, and means for limiting the rotation of said pulleys whenever said operator actuates said last-mentioned tightening means.

9. In combination with two members, one of said members being mounted for tilting with respect to said second member, means for bringing said tilting member into a desired position relative to said second member, said means comprising a plurality of takeup pulleys attached to one of said members, a plurality of cables, one end of each of said cables being attached to one of said pulleys, guide means for said cables attached to the other of said members, a spring for rotating each of said pulleys in a manner to constantly tighten said cables, additional means under the control of an operator for tightening said cables, and means for limiting the rotation of said pulleys whenever said operator actuates said last-mentioned means.

HAROLD A. MARSH.